No. 739,186. PATENTED SEPT. 15, 1903.
C. W. KENNEDY & F. A. POCOCK.
S. H. KENNEDY, ADMINISTRATRIX OF C. W. KENNEDY, DEC'D.
CONTROLLER FOR ELECTRIC MOTORS.
APPLICATION FILED APR. 15, 1902.
NO MODEL. 3 SHEETS—SHEET 1.
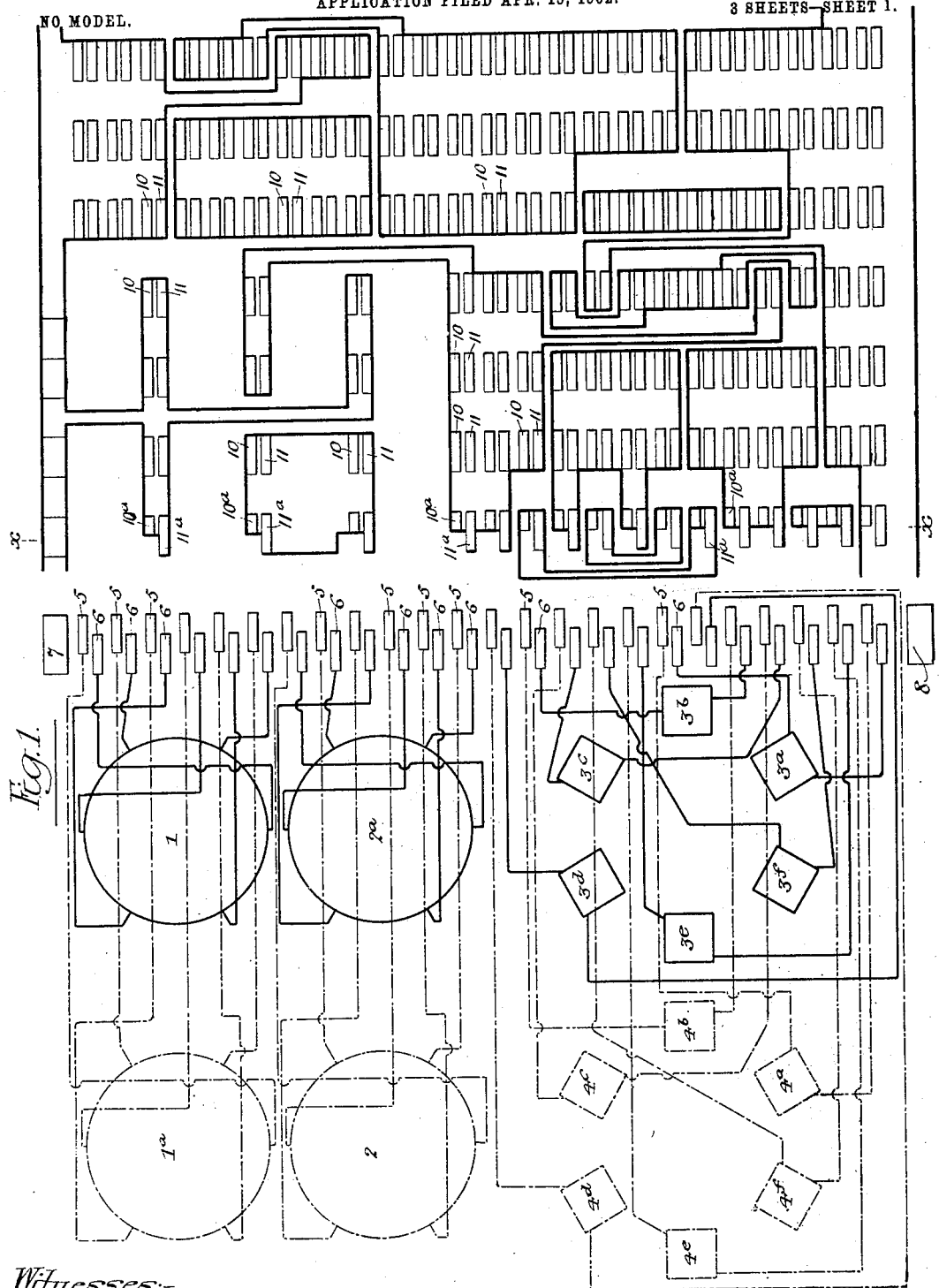

No. 739,186. PATENTED SEPT. 15, 1903.
C. W. KENNEDY & F. A. POCOCK.
S. H. KENNEDY, ADMINISTRATRIX OF C. W. KENNEDY, DEC'D.
CONTROLLER FOR ELECTRIC MOTORS.
APPLICATION FILED APR. 15, 1902.
NO MODEL. 3 SHEETS—SHEET 2.
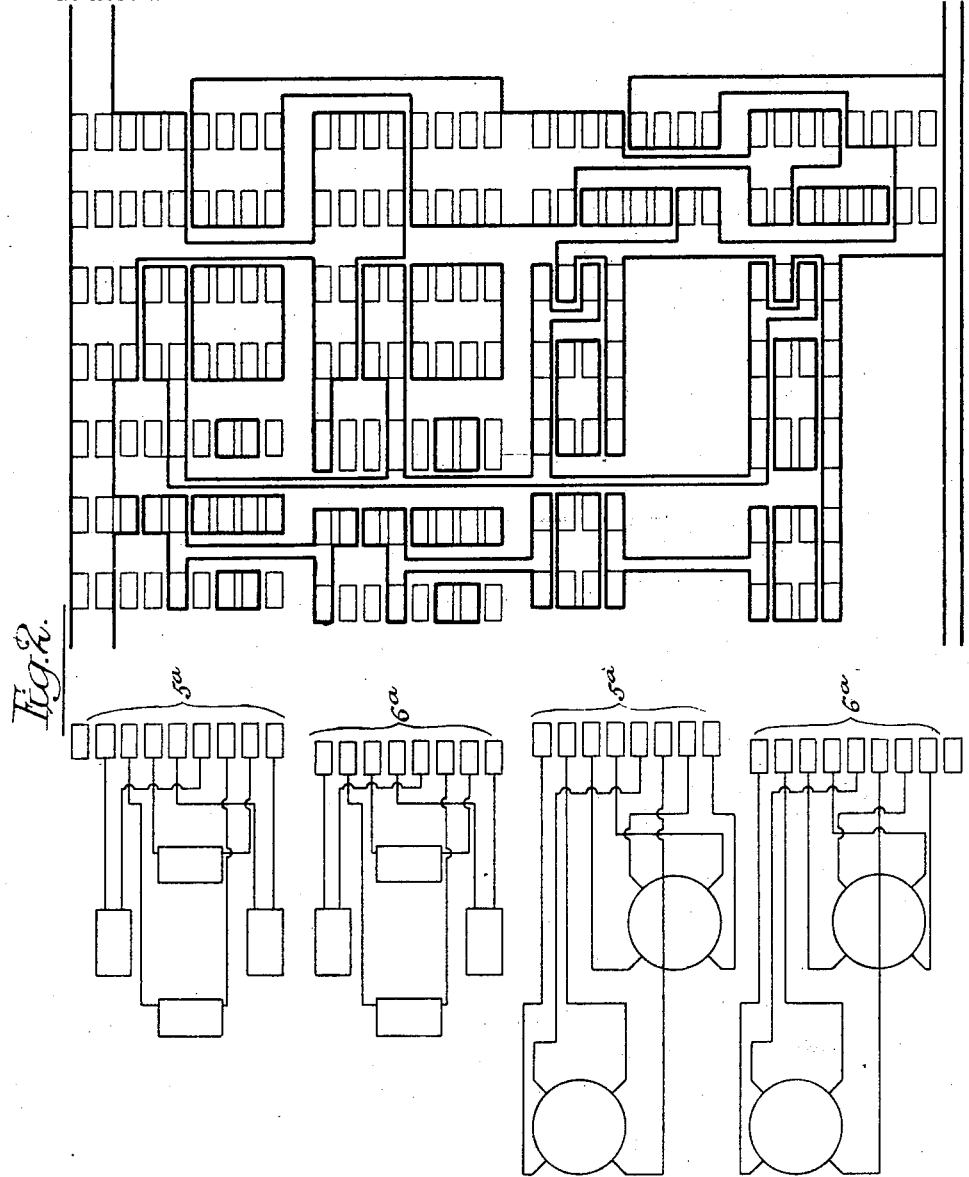

No. 739,186. PATENTED SEPT. 15, 1903.
C. W. KENNEDY & F. A. POCOCK.
S. H. KENNEDY, ADMINISTRATRIX OF C. W. KENNEDY, DEC'D.
CONTROLLER FOR ELECTRIC MOTORS.
APPLICATION FILED APR. 15, 1902.

NO MODEL. 3 SHEETS—SHEET 3.

Witnesses:—

Inventors:—
Charles W. Kennedy,
Francis A. Pocock,
by their Attorneys,
Howson & Howson No. 739,186. Patented September 15, 1903.

UNITED STATES PATENT OFFICE.

CHARLES W. KENNEDY, OF RUTLEDGE, AND FRANCIS A. POCOCK, OF LANSDOWNE, PENNSYLVANIA; SARAH H. KENNEDY, ADMINISTRATRIX OF SAID CHARLES W. KENNEDY, DECEASED; SAID POCOCK AND SAID ADMINISTRATRIX ASSIGNORS OF THREE-EIGHTHS TO EDWARD W. PATTON, OF PHILADELPHIA, PENNSYLVANIA.

CONTROLLER FOR ELECTRIC MOTORS.

SPECIFICATION forming part of Letters Patent No. 739,186, dated September 15, 1903.

Application filed April 15, 1902. Serial No. 103,006. (No model.)

*To all whom it may concern:*

Be it known that we, CHARLES W. KENNEDY, residing at Rutledge, and FRANCIS A. POCOCK, residing at Lansdowne, Delaware county, Pennsylvania, citizens of the United States, have invented certain Improvements in Controllers for Electric Motors, of which the following is a specification.

Our invention relates to certain improvements in controllers for electric motors, and more particularly to an improved controller for operating two or more motors of the type described and claimed in the United States patent granted to Charles W. Kennedy December 27, 1898, No. 616,673.

The object of our invention is to provide a device which shall so control the flow of current to two or more motors as to effect a uniform acceleration of the speed of a vehicle or other machine driven by said motors. This object we attain as hereinafter set forth, reference being had to the accompanying drawings, in which—

Figure 9:
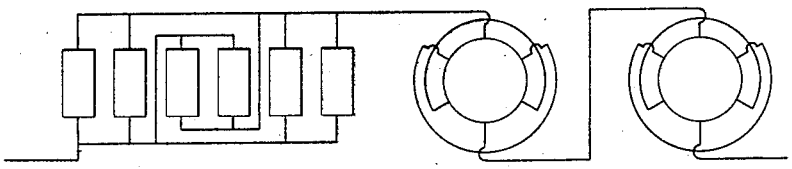
Figure 8:
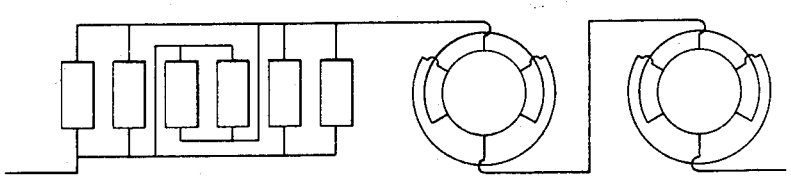
Figure 7:
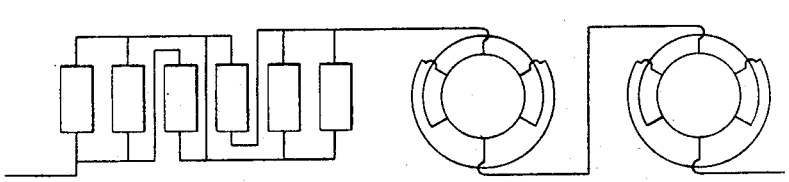
Figure 6:
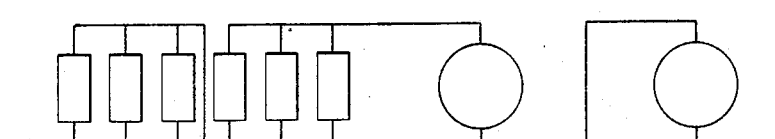
Figure 5:
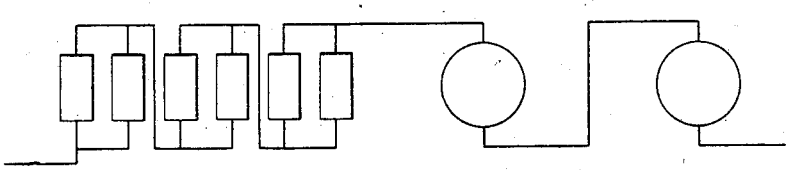
Figure 4:
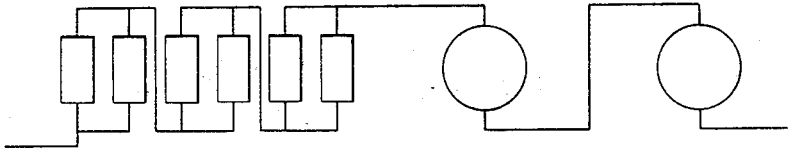
Figure 3:
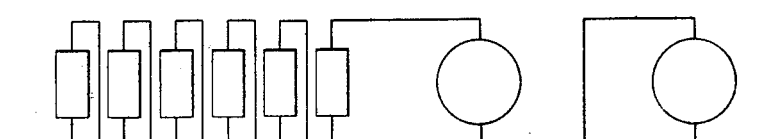

Figure 1 is a diagrammatic view showing the arrangement of fingers and contacts within our improved controller, the barrel of the controller carrying the contacts being shown as developed, the figure also showing the connections between the field-coils and armatures of the two motors and the fingers of the controller. Fig. 2 is another diagrammatic view illustrating a modification of the arrangement shown in Fig. 1, in which a series of contacts are offset from another series of contacts; and Figs. 3 to 9, inclusive, are diagrammatic views showing the various changes and the connections of the fields and armature-windings of each motor for each of the seven points of the controller.

In the patent above referred to a motor is described which has four field-coils and an armature provided with two commutators, there being a set of windings connected to each commutator wholly independent of each other and there being four sets of brushes bearing upon each of said commutators. The speed of this motor was varied by changing the relative connections of the field-coils and of the brushes on the commutators, the field-coils being at times all connected in series, or two pairs in series and two pairs in multiple, or, again, connected so that the motor operated at times as a bipolar machine and at other times as a multipolar machine. Similarly the direction of the current through the two sets of armature-windings was varied so that at times but one set of windings was operated, this being applied through either two or four sets of brushes on one commutator and this set of windings being operated either in connection with the second set of windings or independently of the same. By means of these various combinations of the field-coils and armature-windings a relatively wide range of speed was secured for the motor, it being further noted that it was necessary to break the circuit between each point as the controller was passed from point to point in speeding up the motor. Such breaking of the circuit between points naturally caused very perceptible jerks as the speed of the motor was varied from point to point, although, owing to the counter electromotive force due to the revolution of the armature of the motor, this was not injurious to the motor itself. By our present invention, however, we are enabled to a great extent to overcome this objectionable jerking effect, and with this object in view we employ two or more motors always connected in parallel with each other and supplied with current, as hereinafter described.

In Fig. 1 we have shown our improved controller as applied to a motor having six field-coils, and in the drawings 1 and $1^a$ and 2 and $2^a$ represent, respectively, the double-wound armatures of the two motors, each having six field-coils $3^a$, $3^b$, $3^c$, $3^d$, $3^e$, and $3^f$ and $4^a$, $4^b$, $4^c$, $4^d$, $4^e$, and $4^f$. As in certain well-known forms of electric controllers our improved controller has a number of stationary contact-fingers. These fingers are arranged in two sets or pairs 5 and 6, the fingers 5 of one set being a certain distance in advance of and alternating with those of the other set. These fingers are connected, as shown in Fig. 1, to the field-coils and brushes of the motors, the controller in addition being provided with fingers 7 and 8, permanently connected, respectively, to the positive and negative mains for the supply of electric current. The barrel of the controller is of ordinary form, and attached thereto are metallic plates having upwardly-projecting portions for contact with the fingers 5 and 6. These portions 10 and 11 are also arranged in pairs, and it will be understood that the barrel of the special form of controller forming the subject of our invention is shown as developed, the contact-points engaged on the first point of the controller being indicated by the line $x\ x$ passing through the same. It will be seen that the contact-points 10 and 11 are in all cases mounted in pairs and are preferably of equal surface, except those indicated at $10^a$ and $11^a$ on the line $x\ x$, which points are engaged by the fingers when the controller is turned to the first point. From Fig. 1 it will be seen that each pair of the contact-plates for the first point consists of one of about half of the ordinary length (indicated at $10^a$) and one full-sized plate $11^a$, their difference in length being equal to the distance that the fingers 5 are placed in advance of the fingers 6. The result of this arrangement is that when the barrel of the controller is revolved on its vertical axis in the customary manner all sets of the fingers 5 and 6 in use on the first point make electrical contact with the contact-points 10 and 11 simultaneously, the result being that both of the motors receive current and start simultaneously. However, as the controller is moved from the first to the second point it will be seen that the fingers 5 pass off of the contact-plates $10^a$, and thus break the current flowing to the motor 1. Shortly thereafter these same fingers 5 make contact with the points 10, forming the second point of the controller, after which and before the controller comes to rest on said second point the current flowing to the motor 2 is similarly broken by the contact-fingers 6 passing off of the contacts $11^a$. These fingers 6 then make contact with the plates 11, and both motors are being supplied with current on the second point of the controller. Similarly in passing from the second point to the third and succeeding points the action is the same. In each instance the current flowing to one motor is broken and made; then that flowing to the other motor is broken and made. As a result of this arrangement it will be seen that while the current flowing to each motor is necessarily broken in passing from one point of the controller to the next by our improved arrangement of contact-fingers and contact-plates one motor is always supplied with current, while the other motor is momentarily cut off from its source of supply.

In the arrangement of contacts shown in Fig. 2 the banks of fingers $5^a$ are set in advance of the banks of fingers $6^a$ and the sets of fixed contact-plates are offset in a similar manner. The connections with said plates and fingers being disposed in proper relation to each other, the same effect will be produced when employing this form of controller as with the form shown in Fig. 1. As will be noted, the invention is shown as applied to a four-pole machine in Fig. 2.

Having thus described our invention, we claim and desire to secure by Letters Patent—

1. A controller for electric motors having a movable portion and contacts arranged thereon in sets, said controller also having fixed contacts arranged in sets, with means whereby one member of each set of fixed contacts is electrically connected to a receiving device, and means whereby the other member or members of each set is respectively connected to the same parts of another receiving device or devices, substantially as described.

2. A controller for electric motors having certain of its movable contacts arranged in groups and having its fixed contacts also arranged in groups, certain of the contacts connected to one motor being arranged in advance of those connected to the other motor, substantially as described.

3. A controller for two or more electric motors connected in parallel with each other, said controller having fixed contacts connected to said motors and other contacts movably supported, certain of said contacts being arranged in advance of the others whereby the motor-circuits may be changed alternately, substantially as described.

4. A controller for two or more electric motors connected in parallel with each other, said controller having fixed and movable contacts, the fixed contacts being connected to the motors and arranged in pairs, the alternate contacts being offset whereby the motor-circuits may be changed alternately, substantially as described.

5. A controller for two or more electric motors connected in parallel with each other, said controller having fixed contacts connected to said motors, and a movable member carrying other contacts, certain of its fixed contacts and certain of those carried by its movable member being arranged in advance of the others whereby the motor-circuits may be changed alternately, substantially as described.

6. A controller for two or more electric motors having fixed contacts connected to said motors and movable contacts, said movable and said fixed contacts being arranged respectively in groups, certain of the contacts of each group being arranged in advance of the remainder, and certain of the movable contacts being of less length than the remainder thereof, substantially as described.

In testimony whereof we have signed our names to this specification in the presence of two subscribing witnesses.

CHARLES W. KENNEDY.
FRANCIS A. POCOCK.

Witnesses:
  MURRAY C. BOYER,
  JOS. H. KLEIN.